INVENTORS
STANLEY B. JONES
THOMAS D. MUELLER
PAUL E. BAKER

ATTORNEYS

INVENTORS
STANLEY B. JONES
THOMAS D. MUELLER
PAUL E. BAKER
BY
ATTORNEYS

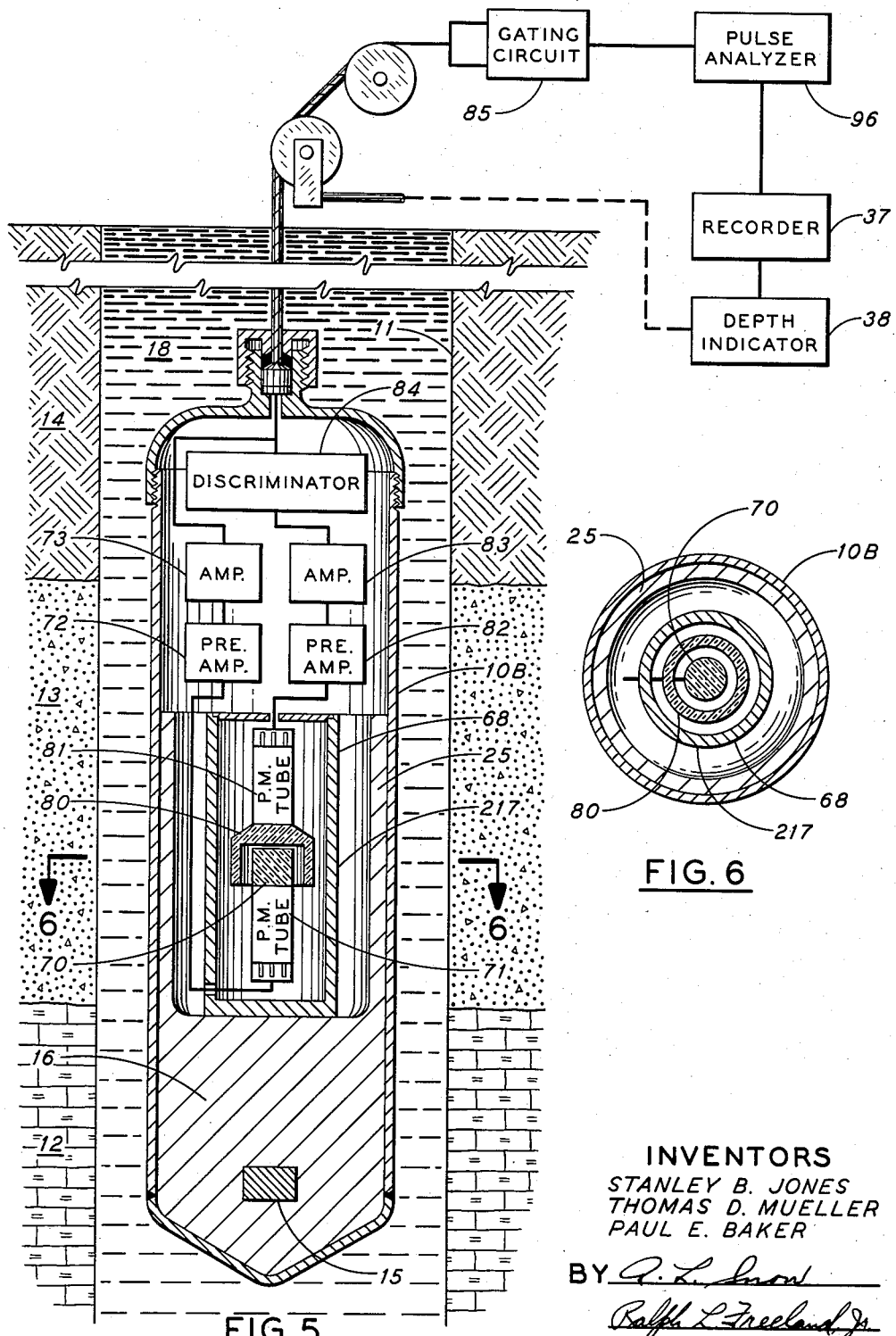

United States Patent Office 3,041,454
Patented June 26, 1962

3,041,454
APPARATUS FOR NEUTRON-CAPTURE
GAMMA RAY LOGGING
Stanley B. Jones, Whittier, Thomas D. Mueller, La Habra, and Paul E. Baker, Anaheim, Calif., assignors to California Research Corporation, San Francisco, Calif., a corporation of Delaware
Filed Dec. 21, 1953, Ser. No. 399,275
8 Claims. (Cl. 250—71.5)

The present invention relates to a method of and apparatus for nuclear well logging and more particularly to a method of investigating the nuclear constituents of earth formations traversed by a well bore by identification of the characteristic neutron-capture gamma ray energy produced by nuclei of elements within the formation excited by the capture of neutrons, and has for an object the provision of an improved method of and apparatus for identifying neutron-capture gamma rays by measurement of their characteristic energies when said gamma rays produce a positron-electron pair in a primary detector and substantially simultaneously emit annihilation radiation detectable in one or more secondary detectors adjacent said primary detector.

While it has been proposed to investigate the constituents of earth formations traversed by a well bore by irradiating the formation with neutrons and then measuring the energy of the resultant gamma radiation that is produced in the formation and penetrates into the bore hole, such energy measurements have not been highly useful in the diagnostic evaluation of the nuclear constituents of the earth formation. The primary reason for the failure of previously known methods and apparatus for such analysis lies in the fact that the spectrum of the gamma radiation produced by neutron-bombardment of the formation is extremely complex and not resolvable into its characteristic components by such methods and apparatus. Additionally, a neutron source such as those commercially available, for example, radium-beryllium or polonium-beryllium, produces a high proportion of gamma rays to neutrons. Thus, when an earth formation traversed by a well bore is irradiated from such a source, the gamma rays emitted by the source are back-scattered by the formation to the detector at the same time that the neutrons emitted by the formation are striking target nuclei within the formation and generating neutron-capture gamma rays.

As disclosed in the co-pending application Serial No. 395,744, now Patent No. 2,888,568, of Stanley B. Jones, one of the co-inventors of the present invention, the problem of detecting neutron-capture gamma rays originating in target nuclei within the formation as a result of neutron bombardment of said formation has been simplified by the arrangement of shielding for the neutron source so that the formation may be irradiated with neutrons originating within the source while the detector is positioned sufficiently close to the source. As particularly disclosed in said co-pending application, the source is shielded by enclosing the source within a bismuth shield, thereby effectively stopping gamma rays emitted by the source. Bismuth is a particularly desirable material for the shield surrounding the source because bismuth has a small neutron-capture cross-section.

As further disclosed in the co-pending Jones application, it has been found possible to facilitate the spectrum analysis by surrounding the detector by a thin shield of bismuth which shields preferentially against low-energy gamma rays which are not of value in the analysis. It has also been found advantageous to surround the detector with a shield of boron, to prevent thermal neutrons from entering the detector. Boron is a particularly desirable material for a neutron shield, because it has a high neutron-capture cross-section and gives only low-energy gamma rays as the result of neutron capture.

In spite of the shielding, the gamma ray spectrum entering the detector is very complex, and the electrical pulse height spectrum generated in the detector is further complicated due to the multiplicity of interaction process by which gamma rays are detected. As shown in the Jones application, due to the different detection processes, the pulse height spectrum shows a continuum and three peaks for each gamma ray energy. It is the purpose of the present invention to provide a method of and apparatus for gamma ray spectrum analysis in which the observed pulse height spectrum is simplified by eliminating from it all pulses corresponding to the continuum and two of the peaks, thus leaving a pulse height spectrum having one peak for each gamma ray energy. As will be described more fully hereinafter, FIG. 7 shows an idealized pulse height spectrum due to monoenergetic gamma rays detected in a conventional scintillation spectrometer. In the method and apparatus to be disclosed herein, only pulses falling in one of the peaks and preferably only those having energies represented by peak C are counted. These pulses are caused by gamma rays interacting by the pair productions effect within the primary detector with the escape of both annihilation quanta from said detector.

In a preferred form of apparatus for carrying out the method of the present invention, a first detector, desirably of the scintillation type, such as a crystal of thallium-activated sodium iodide, is positioned adjacent the formation at a predetermined distance from the neutron-emitting source and in such a position that the instantaneously-emitted gamma rays produced as a result of neutron capture by the constituent elements of the formation may be directly received at said first detecting crystal. Further, in accordance with the invention, at least one additional detector is positioned adjacent the first detector so that annihilation radiation produced in the first detector and escaping from it may be detected in the second detector. Circuit means for electrical pulse analysis are provided for each detector. Coincidence circuitry is provided such that a pulse in the first detector is recorded only if annihilation quanta are detected in the second detector or detectors substantially simultaneously with the occurrence of the pulse in the first crystal. This coincidence requirement thus assures that a pulse in the first detector is recorded only if the pulse is caused by pair production with the escape of both annihilation quanta. Pulses thus produced are measured, counted, and recorded, by the provided circuit means, according to their voltages. The pulse height spectrum recorded in this manner shows one peak for each gamma ray energy. In the well logging operation, the pulse height spectrum is recorded in accordance with the depth of the detector.

In a preferred form of apparatus for carrying out the method of measuring the energy of neutron-capture gamma rays by measuring only one energy peak of those gamma rays producing position-electron pairs, a pair of detecting crystals are positioned adjacent the first detector crystal with said pair of crystals being substantially shielded from directly-emitted neutron-capture gamma rays.

In another form of apparatus for carrying out the method of the present invention, the first detector is provided with a plurality of pairs of detectors for detecting and measuring annihilation radiation produced by a positron-electron pair originating within the first detector, and circuit means are provided for measuring the energy of neutron-capture gamma rays detected by said first detector when any of said plurality of pairs are simultaneously energized in coincidence with the energization of said first detector.

In still another form of apparatus for carrying out the present method of neutron-capture gamma ray spectral energy measurements for the purpose of identifying the constituent elements of an earth formation, the first detector within which said positron-electron pairs are produced upon interception of high-energy neutron-capture gamma rays, is surrounded by a second detector having substantially an annular form within which the positron-electron pair gamma radiation may be detected.

In general, the method of the present invention, useful for investigating the constituents of an earth formation traversed by a bore hole, comprises the steps of irradiating the formation with neutrons and making a spectrum analysis of the resulting neutron-capture gamma rays by means of a first detector whose circuitry is so related to that of a second adjacent detector or detectors that a pulse produced in the first detector is measured and counted only when one or more one-half mev. quanta is detected in the second detector or detectors, and recording the spectrum in accordance with the depth of the detector in the earth.

Further objects and advantages of the present invention will become apparent from the following detailed description, taken in conjunction with the accompanying drawings, which form an integral part of the present specification.

In the drawings:

FIG. 5 is a schematic representation of still another form of apparatus for carrying out the method of the present invention, and particularly illustrates a concentric crystal arrangement.

FIG. 6 is a cross-sectional view in the direction of arrows 6—6 in FIG. 5, further illustrating the concentric arrangement of the primary and secondary detecting crystals.

Figures 1, 2:
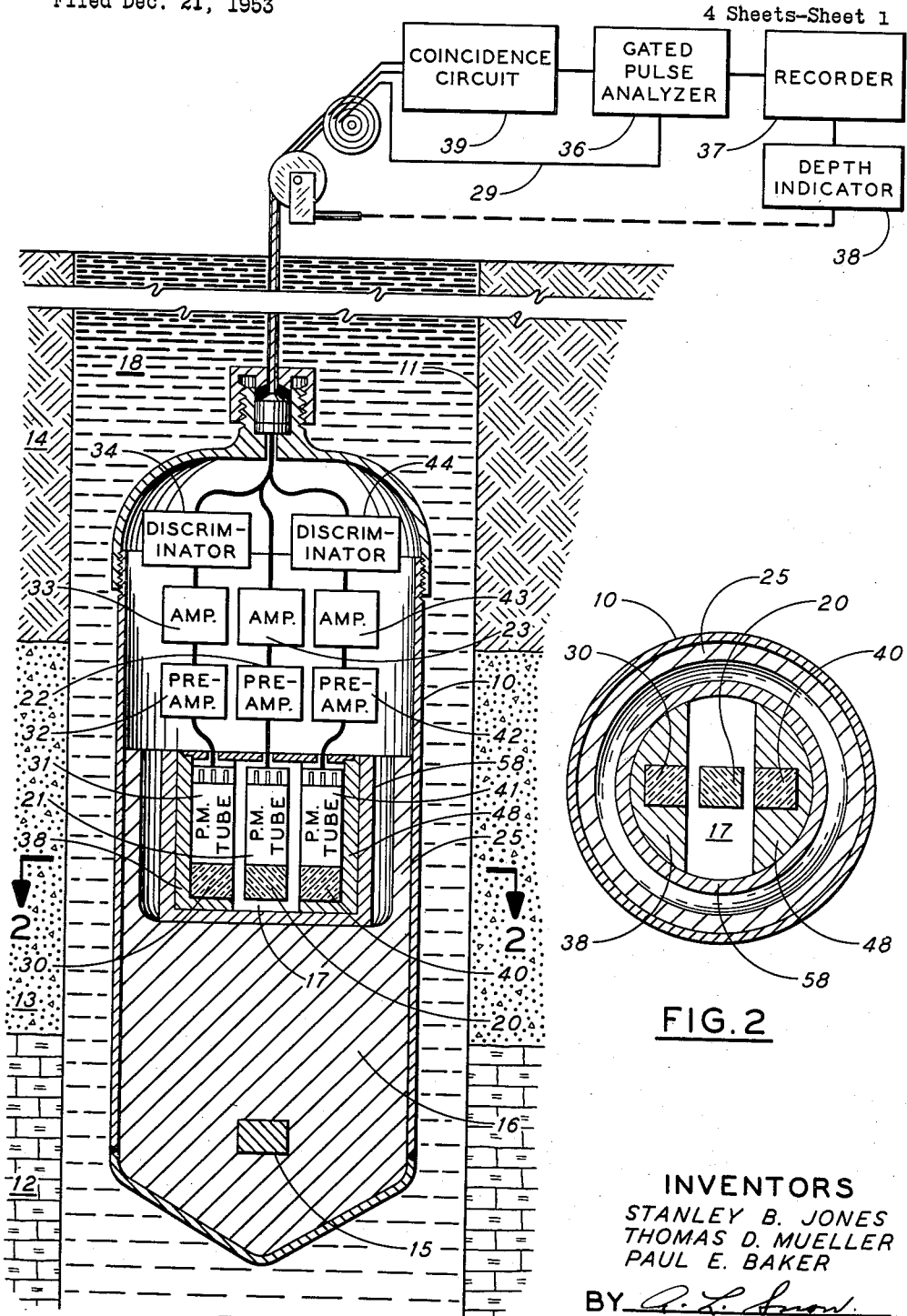
FIG. 1 is a schematic representation of a preferred form of apparatus for carrying out the method of the present invention and particularly illustrates the physical arrangement of the detector crystals in a vertical, sectional view of the logging sonde.
FIG. 2 is a cross-sectional view in the direction of arrows 2—2 in FIG. 1, further illustrating the crystal detector arrangement.

Referring now to the drawings, and in particular to FIGS. 1 and 2, there is illustrated in these figures a preferred form of apparatus for carrying out the method of the present invention. As illustrated, a logging sonde 10 is adapted to traverse a well bore 11 which has penetrated earth formations such as 12, 13, and 14, whose nuclear constituents, including both fluid and solid materials, are to be identified by the characteristic gamma rays emitted by nuclei in the formations in an excited state due to capture of neutrons radiated into the formations from source 15. Source 15 is positioned within shield material 16, which is desirably bismuth, for reasons explained above, so that the source may irradiate the formation with neutrons while the detector arrangement 17 is vertically positioned a predetermined distance from source 16, and sufficiently close to the formation to detect instantaneously-emitted neutron-capture gamma rays originating within the formation.

As mentioned hereinabove, detector arrangement 17 is particularly adapted to detect neutron-capture gamma rays of high energy, such that, upon absorption within a crystal, they may produce a positron-electron pair to which the energy of the gamma ray is imparted. As further discussed above, such neutron-capture gamma ray energy may be detected in a first detector of the scintillation crystal type, which in the arrangement of FIGS. 1 and 2, is a central crystal 20. In a preferred form of apparatus, crystal 20 is a crystal of sodium iodide activated by thallium wherein gamma rays of neutron-capture type may be intercepted and produce scintillations therein in which a total number of light photons are emitted proportional to the energy that the incoming gamma ray imparts to the crystal. This energy, as represented by the total number of light photons, may be converted into an electrical signal of corresponding amplitude by means of photomultiplier tube 21 and pre-amplifier 22.

As particularly shown in FIG. 2, crystal 20, as well as side crystals 30 and 40 are positioned within a cup portion 25, which is an upward extension of the bismuth shield 16, so that low-energy gamma rays may be excluded from crystals 20, 30 and 40. Crystals 30 and 40 are partially shielded against gamma rays from the formation by shields 38 and 48, preferably composed of bismuth. A boron shield 58 is provided to prevent neutrons from entering the detector crystals.

In accordance with the present invention, crystals 30 and 40 are so positioned with respect to central or primary crystal 20 that the radiation due to annihilation of the positron of the positron-electron pair generated within crystal 20 may be transmitted to side crystals 30 and 40. Said annihilation radiation is in the nature of a pair of gamma rays transmitted at 180 degrees with respect to each other when said positron combines with an electron. These annihilation-type gamma rays have an energy of substantially 0.51 mev., and it is the purpose of crystals 30 and 40 to intercept and detect these annihilation quanta.

Electrical pulses produced in the circuits of the secondary detectors, as a result of gamma ray detection in crystals 30 and 40, are amplified in amplifiers 33 and 43 and passed to pulse height discriminators 34 and 44. These discriminators are pre-set to accept only those pulses, produced respectively in photomultipliers 31 and 41, and preamplifiers 32 and 42, whose voltages fall in a narrow range corresponding to a narrow energy range which includes the value 0.51 mev. Pulses that are accepted by these discriminators cause the discriminators to put out pulses to the pulse gating circuit, identified as 36. This circuit includes a coincidence circuit which is activated only when it receives pulses simultaneously from both of the discriminators 34 and 44. When such coincidence occurs, the gating circuit is prepared to accept pulses from the central amplifier 23. Thus, pulses from amplifier 23 are permitted to pass the gate and enter pulse analyzer 36 only when they occur in coincidence with two simultaneous pulses, of amplitudes corresponding approximately to 0.51 mev., in the side detectors. Pulses in the central detector, when occurring in the required coincidence, are separated according to their amplitudes by the pulse analyzer 36, and a record of the number of pulses per unit time as a function of pulse amplitude is shown on recorder 37, on which a record is simultaneously shown of the depth of the logging sonde as determined by depth indicator 38.

It will be understood that, with the arrangements of FIGS. 1 and 2, the center crystal 20 may also be used to identify neutron-capture gamma rays having an initial energy characteristic of one of the formation elements when only one gamma ray of ½ mev. is detected in one of the side crystals 30 or 40. Under these circumstances, the energy spectrum measured within the central crystal 20 will show two peaks for monoenergetic gamma rays, one equivalent to the initial energy of the neutron-capture gamma ray minus ½ mev., the other equivalent to the gamma ray energy minus 1 mev. Thus, under these circumstances, it may be desirable to adjust the mixing and gating circuits 35 to measure the energy detected at crystal 20 when only one of the side crystals 30 or 40, through its discriminator 34 or 44, emits a ½ mev. pulse.

Figures 3, 4:
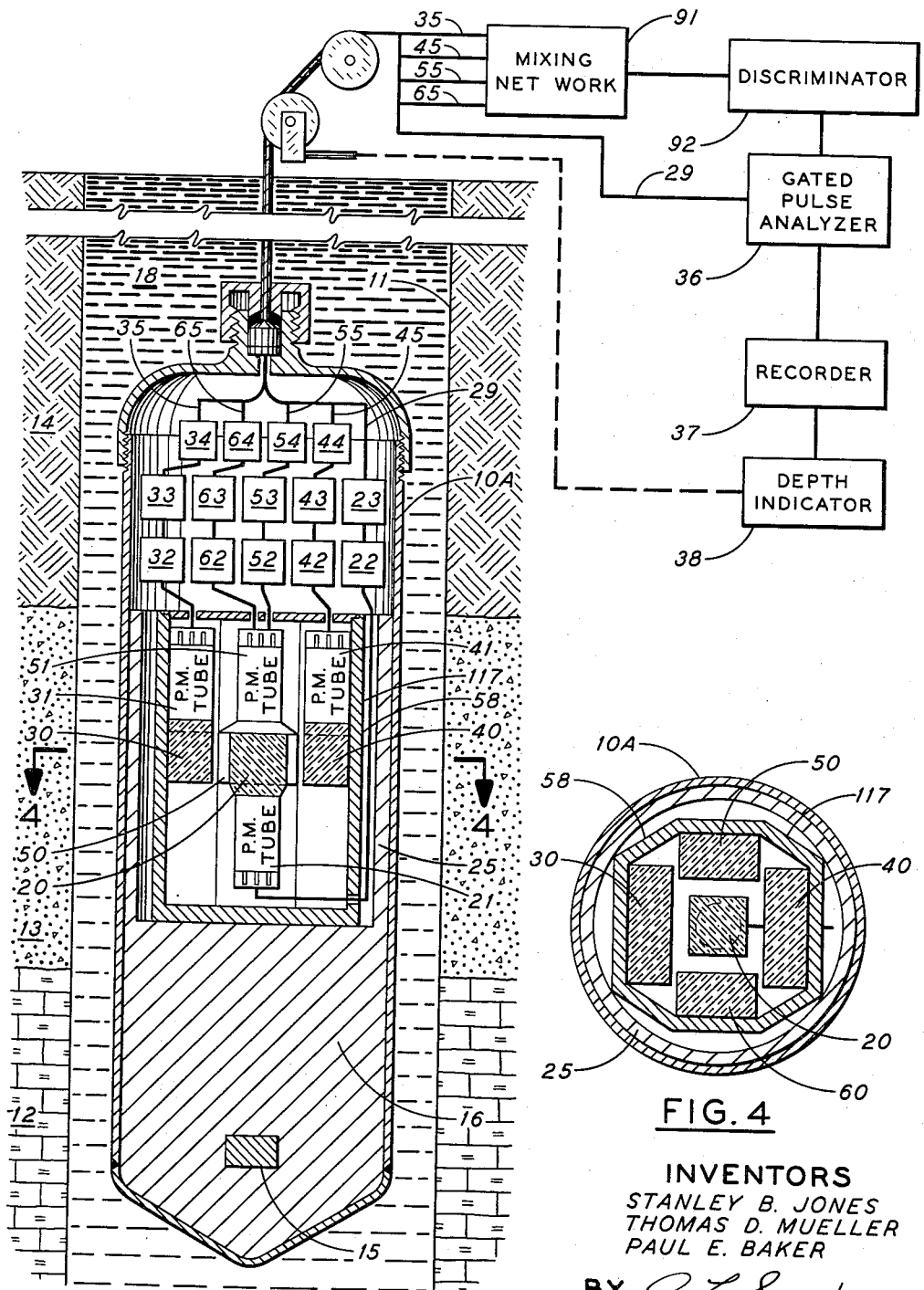
FIG. 3 is an alternative form of apparatus for carrying out the method of the present invention which particularly illustrates a configuration of detecting crystals in which a plurality of pairs of side crystals are arranged adjacent the primary detecting crystal.
FIG. 4 is a cross-sectional view in the direction of arrows 4—4 in FIG. 3, further illustrating the geometrical pattern of the detecting crystals.

Reference may now be made to FIGS. 3 and 4 wherein there is illustrated an alternative arrangement for recording the characteristic gamma ray energy of constituent elements of an earth formation. As particularly distinguished from the arrangement of FIGS. 1 and 2, the system of FIGS. 3 and 4 provides a means for capturing a larger portion of the pairs of annihilation quanta initiated within crystal 20 by the annihilation of the positron produced by the high-energy neutron-capture gamma rays. As best seen in FIG. 4, the central or first detector, crystal 20, for measuring the characteristic energies is surrounded by four side crystals, respectively indicated as 30, 40, 50 and 60. Each of these crystals is adapted to convert gamma ray energy to light photons, and through its respective photomultiplier tube 21, 31, 41, 51 and 61, provides an electrical pulse corresponding in magnitude to the total number of light photons generated in the crystal by a detected gamma ray. Each photomultiplier tube is in turn connected to a preamplifier designated in the drawing as 22, 32, 42, 52, 62, which is respectively connected to a linear amplifier 23, 33, 43, 53, 63. The output of each linear amplifier is in turn respectively connected to a discriminator 34, 44, 54, 64. These discriminators, as in the case of the side discriminators of FIG. 1, are preset to pass pulses corresponding approximately to 0.5 mev. The outputs of these discriminators are transmitted over cables 35, 45, 55, and 65 to the mixing network 91 where the outputs are added together, giving the mixing network an output proportional to the number of pulses entering it simultaneously from discriminators 34, 44, 54, 64. Discriminator 92 is set to pass the pulses from the mixer only when the amplitude of these pulses corresponds to two simultaneous pulses from discriminators 34, 44, 54, 64. When the pulse entering discriminator 92 is of the preset amplitude, this discriminator puts out a pulse which activates the gate of pulse analyzer 96, permitting the pulse from control amplifier 23 to enter this analyzer, if such a pulse is present. It is thus seen that a pulse in the central detecting system is permitted to enter pulse analyzer 96 only if it occurs simultaneously with pulses of about 0.51 mev. energy in two of the side detectors. It will be understood that the output of pulse analyzer 96 is recorded on recorder 37 in accordance with the depth of the logging sonde 10A in the well bore, as indicated, through depth indicator 38. The detector arrangement 117 in this embodiment will be surrounded by a boron shield entirely surrounding the crystals and the associated photomultiplier tubes. This shielding arrangement is indicated as the polygonal shell 58. This shielding provides a means for excluding thermal neutrons from the detector crystals.

As in all of the crystal structures and photomultiplier tube arrangements, for example crystal 20 and photomultiplier tube 21, the crystals are surrounded by a reflecting material and sealed to the face of the photomultiplier tube so that high efficiency of light transmission is obtained and the resulting proportional electrical signal, representative of the energy dissipated in the crystal by the gamma rays detected therein, may be measured as accurately as possible.

Referring now to the arrangement of FIGS. 5 and 6, there is illustrated therein an alternative form of apparatus for carrying out the present method of nuclear spectroscopic analysis of formation elements. The novel features and advantages of the apparatus shown in FIGS. 5 and 6 are particularly described in application Serial No. 403,263, filed January 11, 1955 by Walter E. Meyerhof, a co-worker with applicants. Said application is likewise assigned to the assignee of the present invention. The apparatus shown in FIGS. 5 and 6 is particularly characterized by the arrangement of crystals 70 and 80 being substantially concentric in their positions. Pulses in the primary detection system due to the detection of gamma rays in detector crystal 70 are analyzed in pulse analyzer 96 and recorded in recorder 37 when they occur in coincidence with pulses of a predetermined energy in the secondary detector crystal 80. The secondary detection system comprises crystal 80, preamplifier 82, amplifier 83, and discriminator 84. The primary or central detection system comprises crystal 70, preamplifier 72, amplifier 73, pulse analyzer 96, and recorder 37, on which the pulse amplitude spectrum is recorded in accordance with the depth of the sonde in the earth as measured by depth indicator 38. The output of the secondary detector 84, which occurs only when the pulse entering the detector has an amplitude falling in a pre-set range, activates the gating circuit 85, permitting a coincident pulse in the central detection system to pass through to the pulse analyzer 96.

As in accordance with the previous embodiments, the crystals 70 and 80 are desirably positioned within a boron shield 48 and further positioned within an upward extension 25 of bismuth shield 16 surrounding and isolating the neutron source 15 from the detector arrangement designated generally as 217. A fundamental difference between this form of apparatus and those of FIGS. 1 and 3 is that, in the form shown in FIGS. 5 and 6, a pulse in the primary detector system is accepted for analysis if it occurs in coincidence with a pulse of predetermined amplitude in one secondary detector, whereas in the form of apparatus of FIGS. 1 and 3 a pulse in the primary system is accepted for analysis only if it occurs in coincidence with pulses of predetermined amplitude in two secondary detectors. In the form of apparatus shown in FIGS. 1 and 3, the amplitude of pulses accepted in the secondary detectors corresponds to approximately ½ mev. In the form of apparatus shown in FIG. 5, the amplitude of pulses accepted by the secondary discriminator may be that corresponding either to ½ mev. or to 1 mev. If ½ mev. pulses are accepted, the pulse spectrum shows two peaks for monoenergetic gamma rays, the peaks corresponding to the gamma ray energy minus 1 mev. and the gamma ray energy minus ½ mev. If 1 mev. pulses are accepted, the pulse height spectrum shows one peak for monoenergetic gamma rays; the peak corresponding to the gamma ray energy minus 1 mev.

It is seen that the form of apparatus shown in FIG. 5 is not so exacting in its coincidence requirement as are the forms of FIGS. 1 and 3, and is more susceptible to accidental triggering of the primary analyzer due to the accidental coincidence of the pulse in the center crystal with a pulse due to a 1 mev. gamma ray in the side crystal. However, this additional complicating factor is not sufficiently objectionable to prevent adequate measurement of the characteristic energies from neutron-capture gamma rays originating in the earth formations under investigation.

Figure 7:
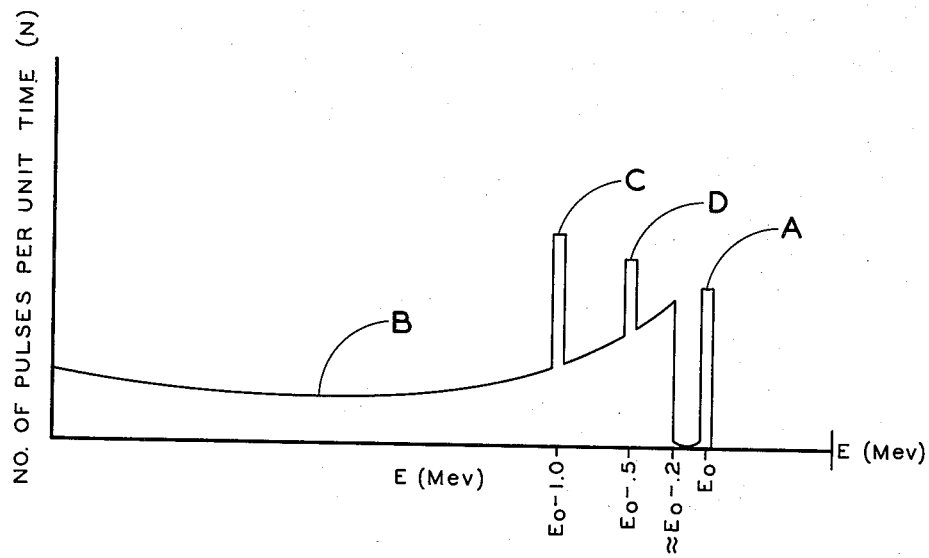
FIG. 7 is a graph showing the energy spectrum of scintillations produced by monoenergetic gamma rays in a detector crystal such as thallium-activated sodium iodide. This figure may also be considered as an idealization of the voltage spectrum of the electrical pulses resulting in a single crystal scintillation spectrometer due to the detection of monoenergetic gamma rays.

The particular purposes and advantages of the coincidence method of gamma ray spectroscopy herein described is further understood in reference to FIG. 7. As mentioned above, and as further discussed in the copending Jones application referred to above, the scintillation energy spectrum illustrated in FIG. 7 and produced by monoenergetic gamma rays derives its complexity from the multiplicity of types of interactions occurring between the detected gamma rays and the scintillation crystal. It is to be remembered that the energy of the scintillation does not correspond directly to the energy of the gamma ray producing the scintillation, but to the amount of energy imparted to the crystal in the interaction between the gamma ray and the crystal. The energy thus imparted to the crystal by a gamma ray quantum is sometimes the total gamma ray energy and sometimes less than the total, depending on the particular kind of interaction. The relative frequencies of occurrence of the different kinds of interactions follow well known laws of probability, depending upon the energy of the incident gamma ray and upon the material of which the crystal is composed and the size of the crystal. The gamma ray quanta producing the illustrated scintillation spectrum all have initial energy $E_0$.

In FIG. 7, for a single crystal, the continuum B is produced by Compton effect collisions, in which the energy transferred from the gamma ray to the crystal may have any value between zero and approximately $E_0$–0.2 mev. The scintillations falling in peak C are due to pair production with the escape of both annihilation quanta. Peak D is due to pair production with the absorption in the crystal of one of the annihilation quanta. Peak A, in which the scintillations have the full energy of the incident gamma ray quanta, is due partly to absorption of the incident gamma rays by the photoelectric effect, partly by single or multiple Compton scattering followed by the photoelectric effect, and partly by pair production accompanied by the absorption of both annihilation quanta.

In a single crystal scintillation spectrometer, the actual pulse height spectrum, that is, the voltage distribution of the pulses entering the pulse analyzer, is qualitatively the same as the scintillation energy spectrum of FIG. 7 but with the important practical difference that the peaks are much wider in the pulse height spectrum. The spreading of the peaks is due to imperfect correspondence between scintillation energy and electrical pulse voltage.

The gamma ray spectrum to be analyzed in the method of well logging to which our invention refers is composed of several monoenergetic groups of gamma rays plus a continuum. One objective in this well logging method is to determine the energy of each monoenergetic group of gamma rays. Such a determination constitutes a spectrum analysis, and it is seen from the foregoing, and from the discussion in the Jones application previously referred to, that the gamma ray spectrum analysis is not direct, but is inferred from the analysis of the pulse height spectrum. An advantage of the method of gamma ray spectrum analysis herein discussed is now readily seen: If the gamma ray spectrum itself has several monoenergetic groups, and each monoenergetic group produces, in the pulse height spectrum, three peaks, the use of these peaks ot identify the groups of gamma rays is complicated, and further, the spreading of the peaks will cause some of them to disappear. In the method of the present invention, only one peak, or at most two in one form of apparatus, occurs in the pulse height spectrum for each monoenergetic group of gamma rays. The inference of the gamma ray spectrum from the pulse height spectrum is thus greatly simplified, and also the chances of having peaks lost due to their overlapping is greatly reduced.

From the foregoing description of the several forms of apparatus disclosed herein, it will be appreciated that there is provided a method of investigating the nuclei of earth constituents traversed by a well bore which includes positioning a first detector adjacent said formation to sense the arrival of neutron-activated gamma rays instantaneously emitted by nuclei of elements in an excited state within the formation when such nuclei interact with neutrons from a neutron source. Measurement of the resultant energy of said neutron-activated gamma rays in said first detector is then made only when there is detected in at least another detector adjacent the first detector, and coincidentally-occurring therewith, annihilation radiation produced as a result of the annihilation of the positron from a positron-electron pair produced in the first detector. In this way, the nuclear constituents of the formation may be identified by characteristic gamma ray energies particularly indicative of those constituents.

While various modifications and changes in the method and apparatus disclosed in the present application will occur to those skilled in the art, all such modifications and changes which fall within the scope of the appended claims are intended to be included therein.

We claim:
1. Apparatus for identifying the pair production energies of gamma rays originating from neutron-excited nuclei of constituent elements of an earth formation traversed by a well bore comprising a neutron source for irradiating an earth formation, a plurality of scintillation crystals positioned adjacent each other a predetermined distance from said source, shielding means between said neutron source and said plurality of crystals, circuit means for converting individual quanta of radiation energy detected by each of said crystals to individual electrical pulses each of which is proportional in amplitude to said detected energy, gating circuit means connected to said circuit means to control passage of electrical pulses from one of said crystals to a measuring circuit, said gating circuit being operable to pass said pulses from said one crystal upon coincidence of at least another electrical pulse at said gating circuit of amplitude corresponding to the energy of an annihilation quantum originating in another of said plurality of crystals, further shielding means between said plurality of crystals and said earth formation to exclude radiation energy substantially equivalent to that of annihilation quanta originating in said formation, and means for recording the electrical pulses from said one crystal in accordance with the depth of said crystals in a well bore.

2. Apparatus in accordance with claim 1 which includes means for operating said gating circuit to pass said pulses from said one crystal in response to the generation of two other pulses of amplitudes corresponding to the energies of two annihilation quanta produced by another of said crystals and coincident with each pulse from said one crystal.

3. Apparatus for idnetifying unknown constituent elements for an earth formation traversed by a well bore comprising a neutron source for irradiating said formation, a plurality of scintillation detectors positioned a predetermined distance from said source, first shielding means intermediate said detectors and said source and surrounding said detectors to absorb gamma rays from said formation having energies substantially equivalent to an annihilation quantum, said shielding means being constructed of material characterized by its ability to absorb gamma rays emitted by said source and the nuclei of the elements in said shielding means having a small neutron-capture cross-section, additional means for shielding said detectors from thermal neutrons, said additional shielding means being constructed of material characterized by the nuclei of its elements having large neutron-capture cross-sections and emitting low-energy gamma rays, said plurality of scintillation detectors including at least a pair of scintillation crystals positioned adjacent each other and each having an electrical circuit means for converting an individual radiation quantum detected by its crystal to an electrical pulse proportional in amplitude to the energy of the detected radiation quantum, gating circuit means connected to said electrical circuit means, pulse analyzing means operatively connected to the output of one of said electrical circuit means through said gating circuit means for measuring the amplitude of the electrical pulses from said one of said electrical circuit means, means for energizing said gating circuit means when the amplitude of an electrical pulse from another of said electrical circuit means has a predetermined value corresponding to the energy of annihilation quanta and said pulse is generated coincidentally with the measured pulse by the other of said pair of crystals, and means for recording the measured electrical pulses in accordance with the depth of said apparatus in a well bore.

4. Apparatus in accordance with claim 3 with the addition of at least another scintillation crystal and an electrical circuit means therefor and means for energizing said gating circuit in response to the occurrence at said gating circuit means of two electrical pulses, each having a predetermined value corresponding to a pair of annihilation quanta, said two pulses being generated coincidentally with the measured pulse by said other crystal and said additional crystal.

5. Apparatus in accordance with claim 3 with the addition of a plurality of scintillation crystals positioned adjacent the first of said pair of crystals and each having an electrical circuit means for individual radiation energy quanta to an electrical pulse and said gating circuit energizing means being responsive to the generation of electrical pulses corresponding to the energy of two annihilation quanta occurring simultaneously in at least two of said scintillation crystals and in coincidence with the electrical pulse whose amplitude is to be measured.

6. Apparatus for identifying unknown constituent elements for an earth formation traversed by a well bore comprising a neutron source for irradiating said formation, a plurality of scintillation detectors positioned a predetermined distance from said source, first shielding means intermediate said detectors and said source and surrounding said detectors to absorb gamma rays from said formation having energies substantially equivalent to an annihilation quantum, said shielding means being constructed of material characterized by its ability to absorb gamma rays emitted by said source and the nuclei of the elements in said shielding means having a small neutron-capture cross-section, additional means for shielding said detectors from thermal neutrons, said additional shielding means being constructed of material characterized by the nuclei of its elements having large neutron-capture cross-sections and emitting low-energy gamma rays, said plurality of scintillation detectors including at least a pair of scintillation crystals positioned adjacent each other and each having an electrical circuit means for converting an individual radiation quantum detected by its crystal to an electrical pulse proportional in amplitude to the energy of the detected radiation quantum, means for connecting the output of each of said electrical circuit means to gated pulse analyzing means, said gated pulse analyzing means being operable in response to the arrival of at least one electrical pulse having an amplitude corresponding to the energy of an annihilation quantum when said one pulse is in coincidence with the arrival of another electrical pulse at said gated pulse analyzing means, said gated pulse analyzing means including means for measuring amplitude of said other pulse to identify the source of the neutron-capture gamma ray being detected in one of said pair of crystals, and means for recording the measured amplitude of said other electrical pulse in accordance with the depth of said apparatus in a well bore.

7. Apparatus for selectively detecting gamma radiation comprising first, second, and third gamma-ray detectors, said second and third detectors being disposed adjacent and on opposite sides of said first detector, each of said detectors being adapted to produce current impulses in response to interaction of gamma rays therewith, a coincidence network having input channels respectively connected to said second and third detectors, a gate network fed by said first detector, at least two threshold networks connected to the output of said gate network, circuit means connecting said coincidence network to said gate network, whereby said gate network is operative responsively to output impulses from said coincidence network to transmit output impulses of said first detector to said threshold networks, said threshold networks being adapted to selectively transmit said impulses in accordance with their magnitudes, shield means partially surrounding said detectors and preventing radiations originating outside said apparatus from impinging directly on said second and third detectors but leaving said first detector exposed to such radiation arriving from predetermined directions, and means fed by the outputs of said threshold networks for separately recording the output impulses therefrom.

8. Apparatus for identifying the pair production energies of gamma rays originating from neutron-excited nuclei of constituent elements of an earth formation traversed by a well bore comprising a neutron source for irradiating an earth formation, a plurality of scintillation crystals positioned adjacent each other and a predetermined distance from said source, shielding means between said neutron source and said plurality of crystals, circuit means for converting quanta of radiation energy detected by each of said crystals to individual electrical pulses, each of said pulses being proportional in amplitude to said detected energy, gating circuit means connected to said circuit means to control passage of electrical pulses from one of said crystals to a measuring circuit, said gating circuit being operable to pass said pulses from one crystal upon coincidence detection of at least another electrical pulse at said gating circuit of amplitude corresponding to the energy of an annihilation quanta originating in another of said plurality of crystals, and means for recording the electrical pulses from said one crystal in accordance with the depth of said crystals in a well bore.

References Cited in the file of this patent

UNITED STATES PATENTS

| | | |
|---|---|---|
| 2,349,753 | Pontecorvo | May 23, 1944 |
| 2,517,404 | Morton | Aug. 1, 1950 |
| 2,563,333 | Herzog | Aug. 7, 1951 |

OTHER REFERENCES

Sourcebook of Atomic Energy, by Glasstone, published by D. Van Nostrand, Inc., New York in 1950, paragraphs 277–279, 380–388.

UNITED STATES PATENT OFFICE
CERTIFICATE OF CORRECTION

Patent No. 3,041,454                              June 26, 1962

Stanley B. Jones et al.

It is hereby certified that error appears in the above numbered patent requiring correction and that the said Letters Patent should read as corrected below.

Column 2, line 6, for "process" read -- processes --; line 24, for "productions" read -- production --; line 58, for "position-electron" read -- positron-electron --; column 7, line 48, for "ot" read -- to --; column 8, line 38, for "idnetifying" read -- identifying --; column 9, line 12, after "for" insert -- converting --; lines 31 and 32, for "shilding" read -- shielding --.

Signed and sealed this 13th day of November 1962.

(SEAL)
Attest:

NEST W. SWIDER                             DAVID L. LADD
Attesting Officer                        Commissioner of Patents